J. B. MILLS.
HOLDER FOR USE IN SCALING FISH.
APPLICATION FILED MAR. 10, 1917.
1,228,366.
Patented May 29, 1917.
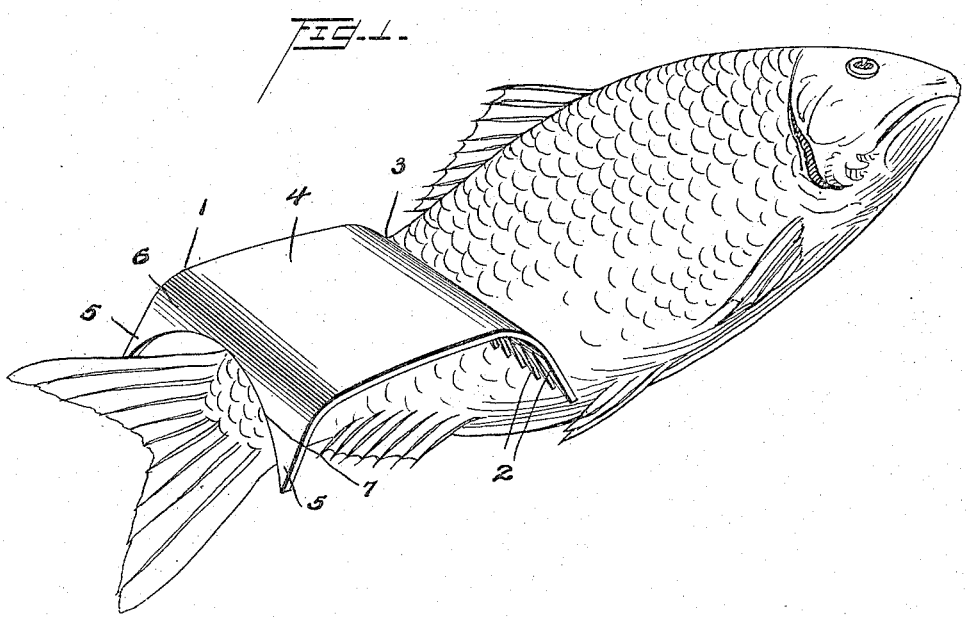
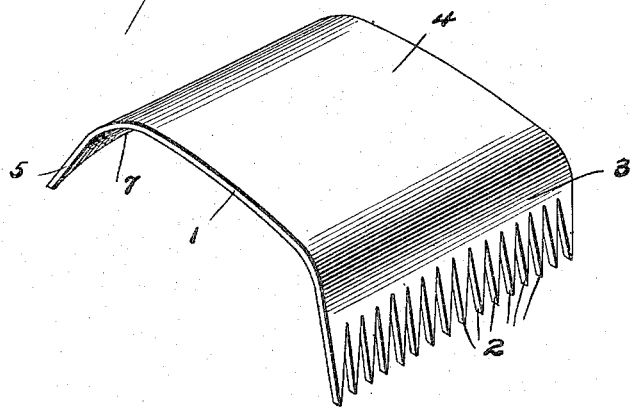

UNITED STATES PATENT OFFICE.

JOHN B. MILLS, OF FORT WAYNE, INDIANA.

HOLDER FOR USE IN SCALING FISH.

1,228,366.

Specification of Letters Patent.

Patented May 29, 1917.

Application filed March 10, 1917. Serial No. 153,868.

*To all whom it may concern:*

Be it known that I, JOHN B. MILLS, a citizen of the United States, residing at 533 Home avenue, Fort Wayne, in the county of Allen and State of Indiana, have invented a certain new and useful Holder for Use in Scaling Fish, of which the following is a specification.

The purpose of my invention is to provide a convenient and effective hand implement for holding fish while they are being scaled.

A further purpose of my invention is to provide devices engaging a fish and a support, respectively, at opposite ends of a hand implement, the intermediate structure forming a handhold for the user.

I have illustrated but one form of my invention, selecting therefor a construction which is inexpensive and has proved in use to be practical and efficient and which at the same time well illustrates the principles of my invention.

Figure 1 is a perspective view of my hand implement in position for use upon a fish.

Fig. 2 is a perspective view showing my implement in another position.

In the drawings, similar numerals indicate corresponding parts.

My holder 1 is provided at its front end with any desired number or shape of projections or points, here shown as a series of teeth 2, for engagement with the body of the fish. The front of the holder is extended upwardly and preferably rearwardly to make the teeth effective and may be further upwardly extended as at 3, above the teeth to give additional height above the fish for the hand hold 4.

At the opposite or rear end of this hand hold 4, the implement is downwardly and preferably rearwardly extended to form prongs 5 for engagement with the support upon which the fish is rested. The extent and direction of the portion 6 carrying these prongs, as in the case of the portion 3 and teeth 2, are matters of convenience largely, depending upon the judgment of the designer, in view of my disclosure herein, and upon the height to which the hand hold 4 is intended to be lifted.

Both for the purpose of making the prongs 5 effective and for the purpose of spanning a portion of the fish when the teeth are placed upon the fish at any considerable distance from either end, the portion 6 is cut away or recessed, as at 7.

In operation, the fish is laid upon any convenient support and the implement or holder is placed upon it where desired, while the scaling operation is performed upon the exposed portion of the fish. The holder is held by one hand of the user, while he is scaling the fish by the other hand. Where the support for the fish is yielding, the prongs 5 will sink into it, reducing the pressure required on the part of the user to keep the holder from moving.

It will be evident that my fish holder is adapted for use by the fishermen in a boat or in connection with any other convenient rest or support for the fish.

Having thus described my invention, what I claim as new and desire to secure by Letters Patent is:

1. In a holder for fish during the scaling operation, a central portion for engagement by the hand, in combination with fish-engaging teeth at one end and support-engaging prongs at the other end of the holder.

2. In a holder for fish during the scaling operation, a central hand hold, in combination with a downwardly-extending fish-engaging front member and a downwardly extending support-engaging rear member.

3. In a holder for fish during the scaling operation, a central hand hold in combination with a downwardly-extending front portion having fish engaging projections thereon and a downwardly-extending rear portion cut away at its middle part and provided with support-engaging prongs at the sides.

4. A holder for fish during the scaling operation having the middle of its length adapted to be grasped by the hand of the user and a front end at an angle to this middle portion and terminating in fish holding means near the middle of its width, the rear end being provided with a clearance opening for the fish.

5. A holder for fish during the scaling operation having its rear terminating in projections at the sides, leaving a clearance space between, in combination with fish holding means at the front end located nearer the middle of the width of the holder than these rear projections.

JOHN B. MILLS.